United States Patent
Suh

(10) Patent No.: US 6,582,335 B2
(45) Date of Patent: Jun. 24, 2003

(54) FORWARD/REVERSE CONTROL SYSTEM FOR CONTINUOUSLY VARIABLE TRANSMISSION

(75) Inventor: Jae-Ik Suh, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 10/003,270

(22) Filed: Dec. 6, 2001

(65) Prior Publication Data

US 2002/0068656 A1 Jun. 6, 2002

(30) Foreign Application Priority Data

Dec. 6, 2000 (KR) .......................................... 2000-73640

(51) Int. Cl.⁷ ................................................ F16H 61/06
(52) U.S. Cl. ...................... 475/129; 475/131; 475/208
(58) Field of Search ................................ 475/129, 131, 475/116, 127, 208; 477/150

(56) References Cited

U.S. PATENT DOCUMENTS

| | | | | |
|---|---|---|---|---|
| 4,898,050 A | * | 2/1990 | Sakai | 477/38 |
| 5,183,439 A | * | 2/1993 | Yumoto et al. | 474/28 |
| 5,273,492 A | * | 12/1993 | Kashiwase et al. | 474/43 |
| 5,792,019 A | * | 8/1998 | Park | 475/206 |
| 6,364,802 B1 | * | 4/2002 | Yi | 475/121 |

FOREIGN PATENT DOCUMENTS

JP 10103477 A * 4/1998

* cited by examiner

*Primary Examiner*—Ankur Parekh
(74) *Attorney, Agent, or Firm*—Antonelli, Terry, Stout & Kraus, LLP

(57) ABSTRACT

Disclosed is a forward/reverse control system for a continuously variable transmission comprising pressure regulating means for controlling an inputted line pressure according to whether a forward or reverse state is required; a manual valve for selectively supplying and exhausting hydraulic pressure, which is supplied from the pressure regulating means, to and from a forward clutch and a reverse brake; and a check ball unit mounted between a forward hydraulic line and a reverse hydraulic line, which are connected respectively to the forward clutch and the reverse brake, the check ball unit operating to communicate the forward hydraulic line with an accumulator when hydraulic pressure acts on the forward clutch and operating to communicate the reverse hydraulic line with the accumulator when hydraulic pressure acts on the reverse brake.

4 Claims, 3 Drawing Sheets

FORWARD/REVERSE CONTROL SYSTEM FOR CONTINUOUSLY VARIABLE TRANSMISSION

BACKGROUND OF THE INVENTION (a) Field of the Invention

The present invention relates to a forward/reverse control system for a continuously variable transmission, and more particularly, to a forward/reverse control system for a continuously variable transmission that simplifies a structure of a hydraulic circuit of the system.

(b) Description of the Related Art

A belt-type continuously variable transmission for vehicles generally includes a continuously variable shifting unit for performing continuous shifting using a drive force transmitted through a torque converter, and a forward/reverse control system for controlling a drive direction of the vehicle. The forward/reverse control system includes a planetary gearset for controlling the forward/reverse control system, and a forward clutch and a reverse clutch for controlling elements of the planetary gearset such that the drive direction of the vehicle is controlled to either forward or reverse.

With reference to FIG. 1, a power clutch 1 and a reverse brake 3 are selectively controlled to engaged and disengaged states by a forward/reverse control system such that a drive direction of the vehicle is controlled to forward or reverse. In such a forward/reverse control system for a continuously variable transmission, line pressure is supplied to or exhausted from the forward clutch 1 and the reverse brake 3 through hydraulic lines selectively formed by control of a N-D control valve 14 and a N-R control valve 12 according to an On and Off operation of a clutch control solenoid valve 5, and it is formed by control of a manual valve 11 according to a range selection of a shift lever.

A forward clutch accumulator 13 and a reverse brake accumulator 15 are provided on hydraulic lines connected respectively to the forward clutch 1 and the reverse brake 3. Each of the accumulators 13 and 15 acts to absorb shock occurring by the engagement of the forward clutch 1 and the reverse brake 3 respectively.

However, a complicated structure results in the conventional forward/reverse control system with the use of all these elements, that is the N-D control valve, the N-R control valve, the forward clutch accumulator, and the reverse brake accumulator.

SUMMARY OF THE INVENTION

The present invention has been made in an effort to solve the above problems.

It is an object of the present invention to provide a forward/reverse control system for a continuously variable transmission, in which an N-D control valve, an N-R control valve, a forward clutch accumulator and a reverse brake accumulator are combined into a single unit to simplify a structure of a hydraulic circuit of the system.

To achieve the above object, the present invention provides a forward/reverse control system for a continuously variable transmission comprising pressure regulating means for regulating an inputted line pressure according to whether a forward or reverse state is required; a manual valve for selectively supplying and exhausting hydraulic pressure, which is supplied from the pressure regulating means, to and from a forward clutch and a reverse brake; and a check ball unit mounted between a forward hydraulic line and a reverse hydraulic line, which are connected respectively to the forward clutch and the reverse brake, the check ball unit operating to communicate the forward hydraulic line with an accumulator when hydraulic pressure acts on the forward clutch and operating to communicate the reverse hydraulic line with the accumulator when hydraulic pressure acts on the reverse brake.

According to a feature of the present invention, the pressure regulating means comprises a pressure regulating solenoid valve for regulating an inputted hydraulic pressure as a duty control pressure; and a pressure regulating valve controlled by the duty control pressure of the pressure regulating solenoid valve to regulate the line pressure and supply the regulated line pressure to the manual valve.

According to another feature of the present invention, the pressure regulating solenoid valve is a normal high type valve.

According to yet another feature of the present invention, the pressure regulating valve comprises a valve spool provided within the pressure regulating valve; an elastic member provided to one side of the valve spool to exert a biasing force thereon; a first port to which the hydraulic pressure supplied to the pressure regulating solenoid valve is supplied, the first port being provided at an opposite side of the pressure regulating valve from the elastic member; a second port to which the duty control pressure of the pressure regulating solenoid valve is supplied to oppose the hydraulic pressure supplied to the first port and control the valve spool; a third port to which the line pressure is supplied; and a fourth port communicating with the third port to enable regulation of the line pressure by control of the valve spool, the valve spool being controlled by the elastic member and the hydraulic pressure supplied to the first and second ports, the fourth port also supplying the regulated line pressure to the manual valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
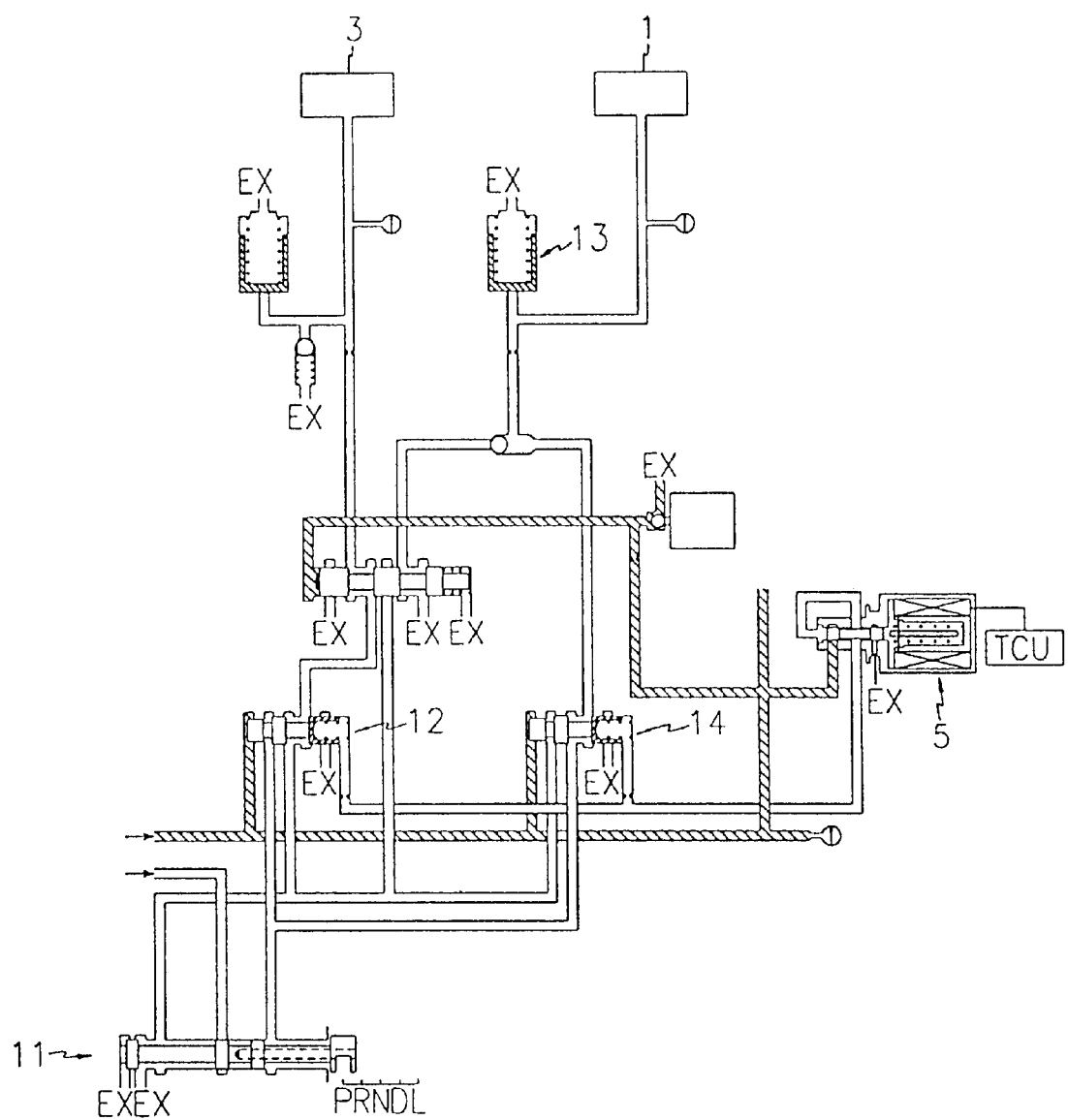
FIG. 1 is a hydraulic circuit diagram of a conventional forward/reverse control system used in a continuously variable transmission.
Figure 2:
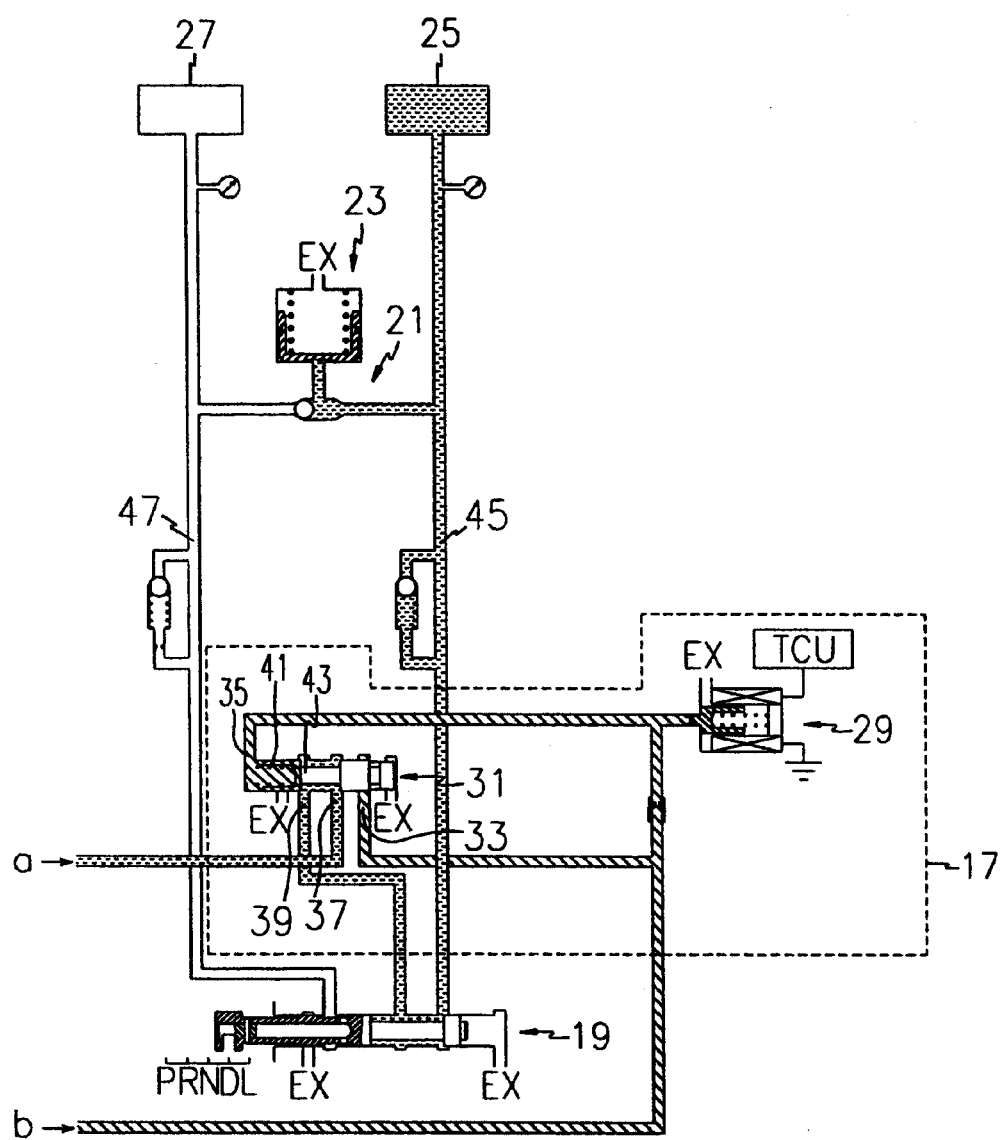
FIG. 2 is a hydraulic circuit diagram of a forward/reverse control system used in a continuously variable transmission according to a preferred embodiment of the present invention, in which hydraulic flow in a forward state is highlighted.

FIG. 2 shows a hydraulic circuit diagram of a forward/reverse control system used in a continuously variable transmission according to a preferred embodiment of the present invention, in which hydraulic flow of a forward state is highlighted.

As shown in the drawing, the forward/reverse control system includes a pressure regulator 17, a manual valve 19, a hydraulic line selector 21, and an accumulator 23. The pressure regulator 17 is mounted to a line pressure line through which a line pressure is supplied to the manual valve 19. The pressure regulator 17 controls the supplied line pressure (a) into hydraulic pressure for operating either a forward clutch 25 or a reverse brake 27, according to whether a forward or reverse state, respectively, is required.

To perform the above functions, the pressure regulator 17 includes a pressure regulating solenoid valve 29 and a pressure regulating valve 31. The pressure regulating solenoid valve 29 controls an inputted hydraulic pressure (b) as a duty control pressure for the pressure regulating valve 31. A variety of configurations for the pressure regulating solenoid valve 29 may be used depending on a structure of the pressure regulating valve 31. A normal high type valve is used as an example in the present invention.

The pressure regulating valve 31 is controlled by the duty control pressure of the pressure regulating solenoid valve 29 to regulate the line pressure (a), after which the regulated pressure is supplied to the manual valve 19. The pressure regulating valve 31 includes first, second, third and fourth ports 33, 35, 37 and 39, and a valve spool 43 supported by an elastic member 41.

The hydraulic pressure (b) supplied to the pressure regulating solenoid valve 29 is also supplied to the first port 33, the duty control pressure of the pressure regulating solenoid valve 29 is supplied to the second port 35, the line pressure (a) is supplied to the third port 37, and the fourth port 39 enables supply of the inputted line pressure (a) to the manual valve 19 after it is pressure controlled. Accordingly, an elastic force of the elastic member 41 and the duty control pressure of the pressure regulating solenoid valve 29 supplied to the second port 35 together oppose the hydraulic pressure supplied to the first port 33.

The manual valve 19 selectively supplies and exhausts hydraulic pressure, which is supplied from the fourth port 39 of the pressure regulating valve 31, to and from the forward clutch 25 and the reverse brake 27. The manual valve 19 is connected to the forward clutch 25 through a forward hydraulic line 45 and to the reverse brake 27 through a reverse hydraulic line 47.

The hydraulic line selector 21 is mounted between the forward hydraulic line 45 and the reverse hydraulic line 47. The hydraulic line selector 21 is structured such that when hydraulic pressure acts on the forward clutch 25, the forward hydraulic line 45 is communicated with the accumulator 23, and when hydraulic pressure acts on the reverse brake 27, the reverse hydraulic line 47 is communicated with the accumulator 23. A check ball configuration is used for the hydraulic line selector 21, as an example, in the present invention.

The accumulator 23 acts to absorb shock generated by the hydraulic pressure supplied to the forward clutch 25 or the reverse brake 27 through the forward hydraulic line 45 or the reverse hydraulic line 47, and it operates through the hydraulic line selector 21.

In the forward/reverse control system for a continuously variable transmission of the present invention as described above, if a shift lever (not shown) is positioned in a drive D range, the manual valve 19 communicates the forward hydraulic line 45 with the fourth port 39 of the pressure regulating valve 31.

The pressure regulating solenoid valve 29 is duty controlled by a transmission control unit (TCU). Accordingly, the duty control pressure supplied to the second port 35 acts on the valve spool 43 in the same direction as does the tensional force of the elastic member 41 to overcome the hydraulic pressure supplied to the first port 33 and control movement of the valve spool 43. As a result, line pressure passing through the third port 37 and the fourth port 39 to be supplied to the manual valve 19 is controlled to a suitable level for operating the forward clutch 25.

The line pressure controlled as in the above is supplied to the forward clutch 25 through the forward hydraulic line 45, which is connected to the manual valve 19, to operate the forward clutch 25. At this time, part of the line pressure supplied to the forward hydraulic line 45 is supplied to the accumulator 23 through the hydraulic line selector 21 such that operational shock of the forward clutch 25 is absorbed.

Figure 3:
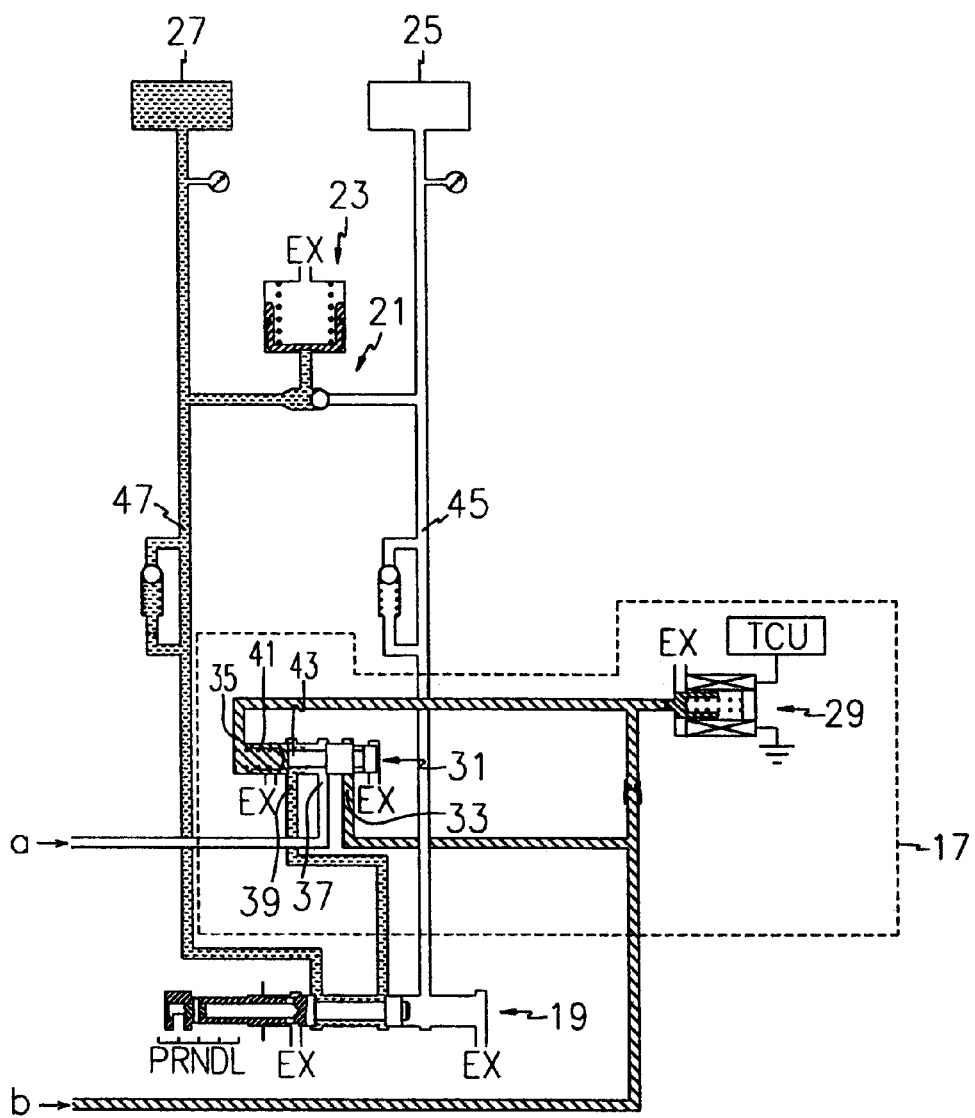
FIG. 3 is the hydraulic circuit diagram of FIG. 2, in which hydraulic flow in a reverse state is highlighted.

However, if the shift lever is positioned in a reverse R range, the supply of hydraulic pressure is as shown in FIG. 3. That is, the manual valve 19 is connected to the fourth port 39 of the pressure regulating valve 31 and to the reverse hydraulic line 47. Further, the pressure regulating solenoid valve 29 is duty controlled by the TCU such that the duty control pressure supplied to the second port 35 acts on the valve spool 43 in the same direction as does the tensional force of the elastic member 41 to overcome the hydraulic pressure supplied to the first port 33 and control movement of the valve spool 43. As a result, line pressure passing through the third port 37 and the fourth port 39 to be supplied to the manual valve 19 is controlled to a suitable level for operating the reverse brake 27.

The line pressure controlled as in the above is supplied to the reverse brake 27 through the reverse hydraulic line 47, which is connected to the manual valve 19, to operate the reverse brake 27. At this time, part of the line pressure supplied to the reverse hydraulic line 47 is supplied to the accumulator 23 through the hydraulic line selector 21 such that operational shock of the reverse brake 27 is absorbed.

In the forward/reverse control system for a continuously variable transmission of the present invention described above, the line pressure controlled by the pressure regulator is supplied directly to the forward clutch and the reverse brake. As a result, the conventional configuration, which utilizes an N-D control valve, an N-R control valve, a forward clutch accumulator, and a reverse brake accumulator, is greatly simplified by providing all these elements in a single unit.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A forward/reverse control system for a continuously variable transmission comprising:

pressure regulating means for controlling an inputted line pressure according to whether a forward or reverse state is required;

a manual valve for selectively supplying and exhausting hydraulic pressure, which is supplied from the pressure regulating means, to and from a forward clutch and a reverse brake; and a check ball unit mounted between a forward hydraulic line and a reverse hydraulic line, which are connected respectively to the forward clutch and the reverse brake, the check ball unit operating to communicate the forward hydraulic line with an accumulator when hydraulic pressure acts on the forward clutch and operating to communicate the reverse hydraulic line with the accumulator when hydraulic pressure acts on the reverse brake.

2. The forward/reverse control system of claim 1 wherein the pressure regulating means comprises:

a pressure regulating solenoid valve for regulating an inputted hydraulic pressure as a duty control pressure; and a pressure regulating valve controlled by the duty control pressure of the pressure regulating solenoid valve to regulate the line pressure and supply the regulated line pressure to the manual valve.

3. The forward/reverse control system of claim 2 wherein the pressure regulating solenoid valve is a normal high type valve.

4. The forward/reverse control system of claim 2 wherein the pressure regulating valve comprises:

a valve spool provided within the pressure regulating valve;

an elastic member provided to one side of the valve spool to exert a biasing force thereon;

a first port to which the hydraulic pressure supplied to the pressure regulating solenoid valve is supplied, the first port being provided at an opposite side of the pressure regulating valve from the elastic member;

a second port to which the duty control pressure of the pressure regulating solenoid valve is supplied to oppose the hydraulic pressure supplied to the first port and control the valve spool;

a third port to which the line pressure is supplied; and a fourth port communicating with the third port to enable regulation of the line pressure by control of the valve spool, the valve spool being controlled by the elastic member and the hydraulic pressure supplied to the first and second ports, the fourth port also supplying the regulated line pressure to the manual valve.

* * * * *